Sept. 8, 1931.  J. R. GAMMETER  1,822,209
METHOD AND APPARATUS FOR CUTTING SHEET MATERIAL INTO STRIPS
Filed Oct. 7, 1926  2 Sheets-Sheet 1
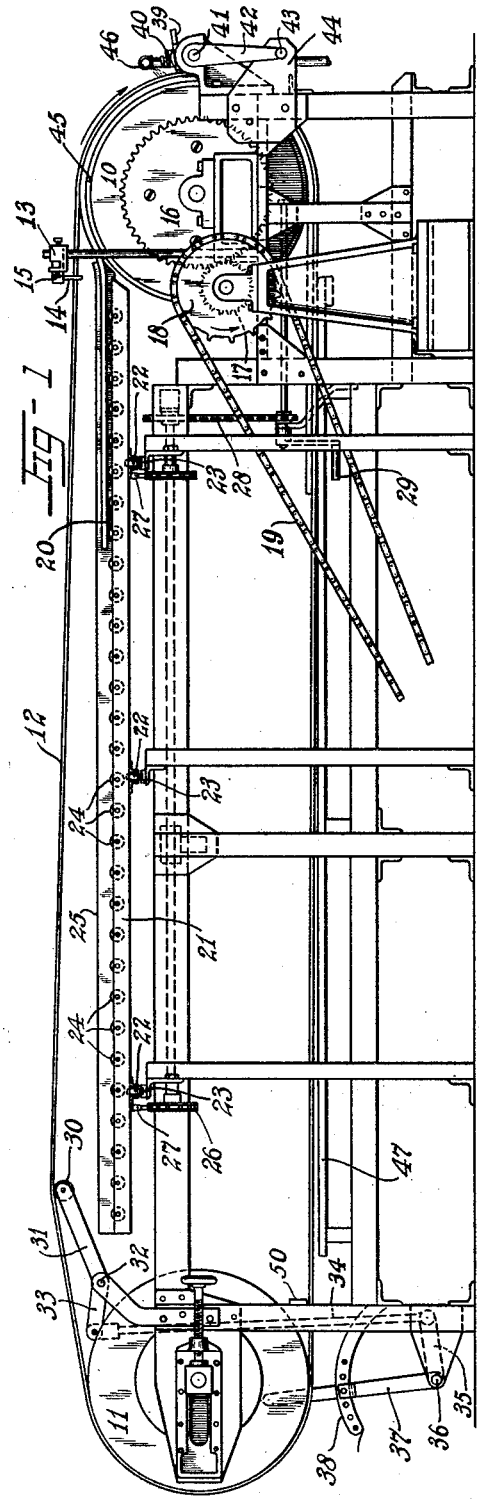
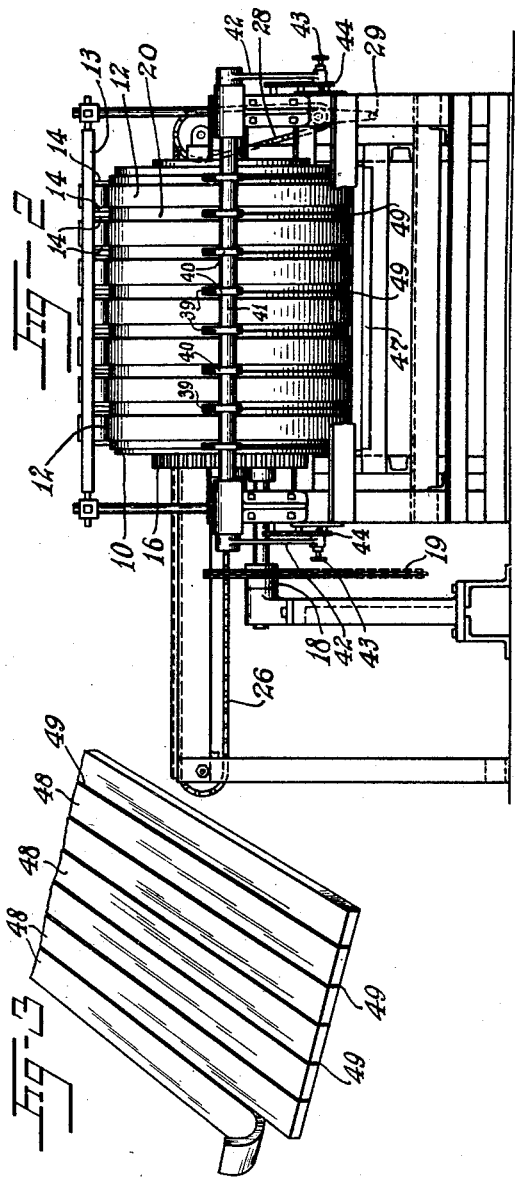
Inventor
John R. Gammeter
By Pierson, Eskin & Avery
Attys.

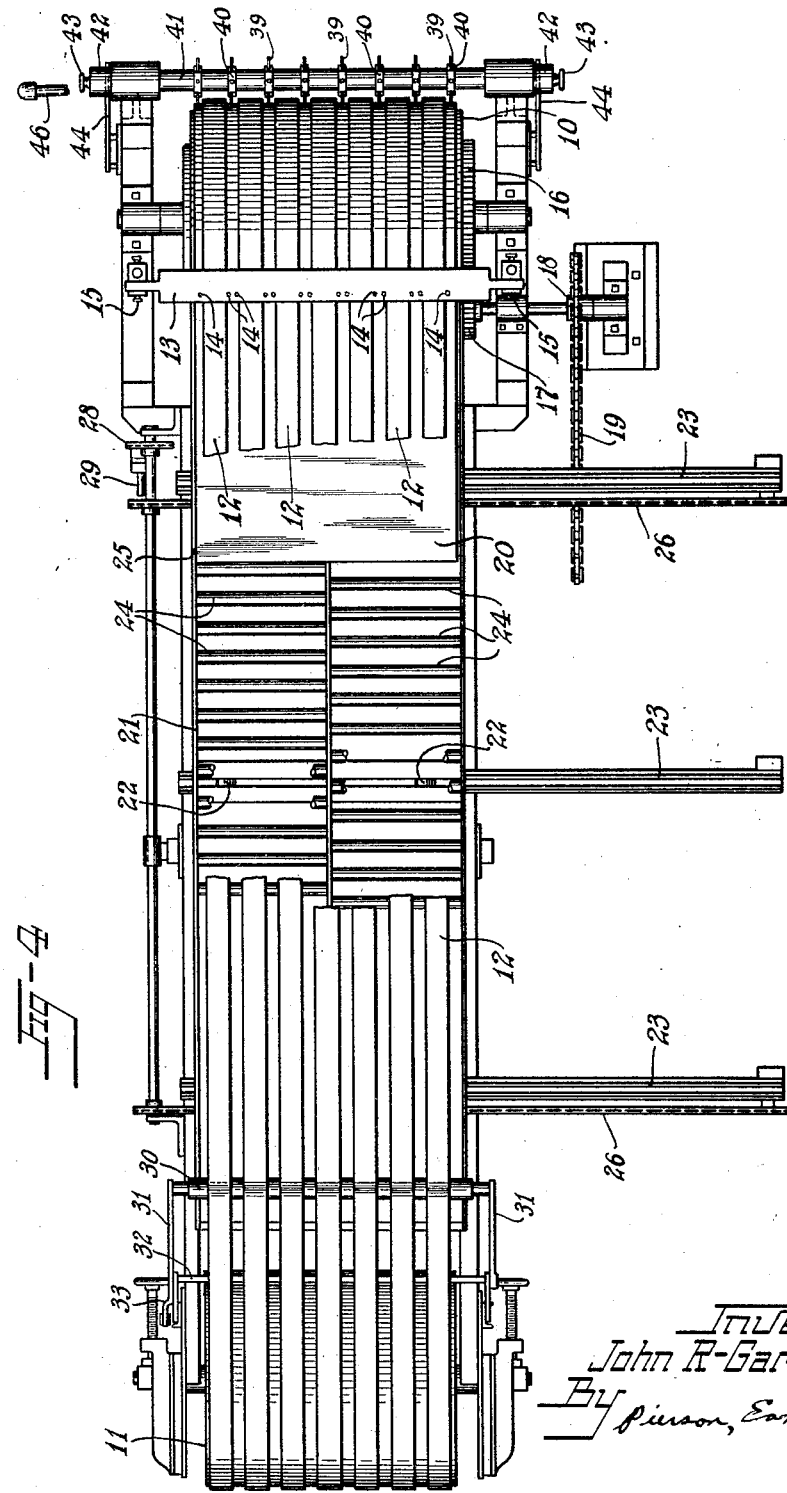

Patented Sept. 8, 1931

1,822,209

UNITED STATES PATENT OFFICE

JOHN R. GAMMETER, OF AKRON, OHIO, ASSIGNOR TO THE B. F. GOODRICH COMPANY, OF NEW YORK, N. Y., A CORPORATION OF NEW YORK

METHOD AND APPARATUS FOR CUTTING SHEET MATERIAL INTO STRIPS

Application filed October 7, 1926. Serial No. 140,022.

This invention relates to methods and apparatus for cutting sheet material into strips as in the case of producing strips of rubber compound suitable for use in forming blocks of floor tiling by simultaneously cutting a plurality of strips from a slab of normally distortable rubber compound, which is usually partially vulcanized before the strip-cutting operation.

My chief objects are to provide for economy and accuracy in the cutting of the strips. A more specific object is to provide improved procedure and apparatus whereby a sheet of material such as thick sheet of rubber stock which is not of endless form may be fed past a gang of slitting knives so that the latter will uninterruptedly cut the sheet entirely through from its leading edge to its trailing edge. A further object is to provide apparatus adapted for ready mounting and removal of the work therefrom.

In attaining these objects in the preferred form of my invention I provide a set of parallel endless belts mounted and laterally spaced apart upon a pair of end rolls, pass the stock about one of the end rolls, under the set of endless belts, and cut the stock in the spaces between adjacent belts as the stock passes around the end roll, by means of a set of gang knives positioned in the respective spaces between the belts.

Of the accompanying drawings:

Fig. 1 is a side elevation of apparatus embodying and adapted to carry out my invention in its preferred form.

Fig. 2 is an end view of the same from the right of Fig. 1, with a part broken away.

Fig. 3 is a perspective view of a slab of rubber stock cut into strips by the said apparatus.

Fig. 4 is a plan view of the apparatus with parts broken away.

Referring to the drawings, the apparatus comprises suitable framework in which are mounted a forward end roll 10 and a rear end roll 11 for a set of endless belts 12, 12 which are guided in spaced apart relation by a guiding-device 13 mounted upon the frame of the machine and comprising pairs of guide pins 14, 14 which straddle the respective belts, the guiding-device 13 being secured in place by set screws 15, 15 and adapted to be readily removed and substituted by a different guiding device to vary the space of the belts for the cutting of strips of different widths. The front end roll 10 is provided with suitable gearing, including gears 16, 17, a sprocket 18 and sprocket chain 19 running from a suitable source of power for driving the end rolls and the endless belts thereon.

For carrying the slab of stock, shown at 20, into position to be fed over the end roll 10 between the latter and the endless belts, a carriage 21 provided with wheels 22, 22 is mounted upon rails 23, 23 which are supported upon the framework and extend transversely of the apparatus from the region under the upper reaches of the endless belts to positions at some distance from the endless belts, so that the carriage can be run out from under the belts to receive the stock sheet 20 and then, with the sheet mounted thereon, run back into position between the end rolls 10 and 11 for feeding the stock sheet 20 from the carriage onto the roll 10.

The carriage comprises a framework in which are journaled numerous idler rolls 24, 24 adapted to support the stock sheet so that it may readily be fed from the carriage, and on the rear side of the carriage the framework thereof includes an upstanding gauge and guide-flange 25 against which the rear edge of the stock sheet may be positioned to assure that it will pass between the roll 10 and the endless belts 12 in proper relation thereto.

Gearing including sprocket chains 26, 26 each having one of its links secured to the underside of the carriage as at 27 and connections including a sprocket chain 28 running to the shaft of a hand crank 29 may be provided for moving the carriage back and forth.

To provide for maintaining proper tension upon the endless belts during the cutter operation and for readily slacking the belts in order to permit the ready starting of the stock sheet about the roll 10, a belt tightener device is provided which includes a tightener roll 30. The said roll is journaled between a pair of arms 31, 31 secured to a rock shaft 32, the latter being connected to a rock shaft 36 by a rocker arm 33 and a link 34 with an arm 35 projecting from the said rock shaft 36. The last mentioned rock shaft is provided with a hand lever 37 adapted to be held in different positions of adjustment by a perforate, arcuate bracket 38, so that the roll 30 may readily be lowered to slack the belts and then raised and fixed in a suitably elevated position to tighten the belts.

The several slitting knives, adapted to cut the stock sheet 20 in the respective spaces between the belts 12 as the stock sheet is carried about the drum 10, are shown at 39, 39, the said knives being adjustably mounted in respective holders 40, 40 which are adjustably clamped upon a common shaft 41 which is rotatably mounted in the framing and is provided at each end with a rocking arm 42 provided at its outer end with a spring plunger 43 adapted to enter a suitable aperture in a bracket 44 mounted upon the framing, to hold the knives inward toward the roll 10, the knives being mounted upon the shaft 41 at a position substantially above its axis so that turning of the shaft moves the knives into and out of cutting relation with respect to the stock sheet upon the roll 10. Because of this arrangement of the knives with respect to the roll 10, the cutting force is applied to the stock sheet of rubber edgewise of the latter, the force being wholly sustained by the frictional contact with which the sheet is embraced by the respective belts.

The roll 10 is preferably covered with a thick layer of rubberized vulcanized fabric 45 into which the points of the knives extend, the knives depressing or cutting slits in the said fabric, so as to assure the cutting of the knives entirely through the stock sheet 20.

Means such as a water spray pipe 46 may be provided for lubricating the knives.

For supporting the lower reaches of the endless belts with the heavy cut strips of rubber stock thereon as the stock passes from the roller 10, a table 47 is mounted under the said lower reaches of the belts and is adapted for the latter to slide thereon.

A stop 50 may be mounted on the frame of the machine in position to prevent the strips from passing to the roll 11 in case of overrunning of the machine.

In the operation of the apparatus the carriage 21 is run out from under the upper reaches of the carrier belts and the stock sheet 20 is placed on the said carriage with its rear edge against the gauge member 25. The carriage is then run back into position under the upper reaches of the endless belts, between the end rolls 10 and 11, by means of the hand crank 29, and when the carriage has thus been appropriately positioned the stock sheet 20 is pushed forward by hand until its leading end portion has progressed partially around the roll 10 but has not yet reached the knives 39, the tightener roll 30 being lowered during this operation to permit the accurate alignment and easy feeding of the stock sheet into the position described. The knives 39 being properly set and held in cutting position by the plungers 43, the tightener roll 30 is raised and fixed in its elevated position so as to maintain the belts tight, and the apparatus is driven, through the sprocket chain 19, throughout a sufficient movement to feed the stock sheet 20 completely from the carriage 21, about the roll 10, and to the position of the lower reaches of the belts, over the table 47. As the stock passes the knives 39 the latter accurately cut it into strips of determinate widths, the stock being compelled to pass the knives in accurate alignment by the frictional grip of the stock between the roll 10 and the endless belts. The cut strips, shown clearly in Fig. 3, are designated 48, 48 and the lines of cut are shown at 49, 49 in Figs. 2 and 3.

The cut strips are then removed from the lower reaches of the endless belts, and the operation as described is repeated.

The operation is very rapid and economical and the strips are cut with great accuracy from end to end, although the stock sheet, not being endless, cannot readily be tensioned for the cutting operation. The apparatus is adapted for ready adjustment to cut strips of different widths, by substituting a suitable guiding-device for the guiding-device 13 to vary the spacing of the endless belts and by re-setting the knife clamps 40, 40 in different positions lengthwise of their shaft 41.

Modifications may be resorted to within the scope of my invention as defined in the appended claims.

I claim:

1. The method of cutting a normally distortable sheet of vulcanized soft rubber into strips which comprises embracing substantial areas of the sheet flatwise on each side of a plurality of lines of cut close to the said lines, and cutting the sheet along the said lines concurrently between said areas while it is so embraced, the cutting force being wholly sustained by the frictional contact with which the sheet is embraced.

2. Apparatus for cutting a normally distortable sheet of rubber into strips, the said apparatus comprising means for tightly embracing substantial areas of the sheet flatwise on each side of a plurality of lines of cut close to the said lines, a set of nonrotating knives so spaced apart as to cut the sheet along said lines by applying a cutting force wholly edgewise of the sheet, and means for causing relative movement between the knives and the sheet along the said lines of cut, the embracing means being so constructed and arranged as to sustain the cutting force of the knives wholly by frictional engagement with the sheet over areas thereof flanking each knife.

3. Apparatus for cutting a normally distortable sheet of rubber into strips, the said apparatus comprising supporting rolls for a set of endless belts, a set of endless belts mounted in spaced apart relation on said rolls, and a set of non-rotating knives mounted respectively in the spaces between the belts, the endless belts and the rolls being so constructed and arranged as to sustain the cutting force of the knives upon a sheet embraced by the belts and one of the rolls wholly by their frictional engagement with the sheet and to embrace the sheet against distortion.

4. Apparatus as defined in claim 3 in which the knives are stationary slitting knives mounted in position to cut the sheet as the latter passes about one of the rolls.

5. Apparatus as defined in claim 3 including means for concurrently slackening and tightening the endless belts.

6. Apparatus as defined in claim 3 including a carriage mounted for movement transverse to the belts to carry the work into and out of alignment with the rolls.

7. Apparatus for cutting a sheet of rubber into strips, the said apparatus comprising a set of endless belts, supporting rolls therefor, a set of knives positioned to cut the sheet between the belts, and a stop adapted to abut the cut strips to limit their movement as they are carried upon the belts.

In witness whereof I have hereunto set my hand this 28th day of September, 1926.

JOHN R. GAMMETER.